(12) United States Patent
Bookbinder et al.

(10) Patent No.: US 7,773,848 B2
(45) Date of Patent: Aug. 10, 2010

(54) LOW BEND LOSS SINGLE MODE OPTICAL FIBER

(75) Inventors: Dana Craig Bookbinder, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/182,313

(22) Filed: Jul. 30, 2008

(65) Prior Publication Data

US 2010/0027951 A1    Feb. 4, 2010

(51) Int. Cl.
 *G02B 6/036* (2006.01)
(52) U.S. Cl. .................................................. 385/127
(58) Field of Classification Search .................. 385/127
 See application file for complete search history.

(56) References Cited

U.S. PATENT DOCUMENTS

| | | | |
|---|---|---|---|
| 4,114,980 A | 9/1978 | Asam et al. | 385/127 |
| 4,385,802 A | 5/1983 | Blaszyk et al. | 385/127 |
| 4,852,968 A | 8/1989 | Reed | 350/96.33 |
| 5,106,402 A | 4/1992 | Geittner et al. | 65/391 |
| 5,175,785 A | 12/1992 | Dabby | 385/123 |
| 5,235,660 A | 8/1993 | Perry et al. | 385/124 |
| 5,491,581 A | 2/1996 | Roba | 359/341.3 |
| 5,586,205 A | 12/1996 | Chen et al. | 385/29 |
| 5,673,354 A | 9/1997 | Akasaka et al. | 385/127 |
| 6,181,858 B1 | 1/2001 | Kato et al. | 385/123 |
| 6,185,353 B1 | 2/2001 | Yamashita et al. | 385/124 |
| 6,280,850 B1 | 8/2001 | Oh et al. | 428/428 |
| 6,317,551 B1 | 11/2001 | Mitchell et al. | 385/124 |
| 6,396,987 B1 | 5/2002 | de Montmorillon et al. | 385/123 |
| 6,415,089 B2 | 7/2002 | Kato et al. | 385/123 |
| 6,424,776 B1 | 7/2002 | Nouchi et al. | 385/123 |
| 6,477,305 B1 | 11/2002 | Berkey et al. | 385/123 |
| 6,490,396 B1 | 12/2002 | Smith | 385/123 |
| 6,510,268 B1 | 1/2003 | de Montmorillon et al. | 385/123 |
| 6,530,244 B1 | 3/2003 | Oh et al. | 65/417 |
| 6,535,676 B1 | 3/2003 | de Montmorillon et al. | 385/123 |
| 6,658,190 B2 | 12/2003 | Hirano et al. | 385/124 |
| 6,754,425 B2 | 6/2004 | Jeon et al. | 385/127 |
| 6,856,744 B2 | 2/2005 | Kumano | 385/127 |

(Continued)

FOREIGN PATENT DOCUMENTS

DE       37 00 565       7/1988

(Continued)

OTHER PUBLICATIONS

Allard, Philippe G et al, "Bending loss of a single-mode triangular-index fiber with a depressed cladding ring by a vector mode method", SPIE vol. 1792 (1992), pp. 146-155.

(Continued)

*Primary Examiner*—Uyen-Chau N Le
*Assistant Examiner*—Chris H Chu
(74) *Attorney, Agent, or Firm*—Robert L. Carlson

(57) ABSTRACT

Optical waveguide fiber that is bend resistant and single mode at 1260 nm and at higher wavelengths. The optical fiber includes a core of radius $R_1$ and cladding, the cladding having an annular inner region of radius $R_2$, an annular ring region, and an annular outer region. The annular ring region starts at $R_2$, and the ratio $R_1/R_2$ is greater than 0.45.

22 Claims, 2 Drawing Sheets

U.S. PATENT DOCUMENTS

| | | | |
|---|---|---|---|
| 6,885,802 B2 | 4/2005 | Oliveti et al. | 385/123 |
| 6,901,196 B2 | 5/2005 | Takahashi et al. | 385/106 |
| 6,904,772 B2 | 6/2005 | Berkey et al. | 65/412 |
| 6,928,211 B2 | 8/2005 | Tanigawa et al. | 385/24 |
| 7,008,696 B2 | 3/2006 | Kim et al. | 428/432 |
| 7,164,835 B2 | 1/2007 | Matsuo et al. | 385/127 |
| 7,171,090 B2 | 1/2007 | Mattingly et al. | 385/124 |
| 7,187,833 B2 | 3/2007 | Mishra | 385/127 |
| 7,221,838 B2 | 5/2007 | Jakobsen et al. | 385/123 |
| 7,272,289 B2 | 9/2007 | Bickham et al. | 385/128 |
| 7,283,714 B1 | 10/2007 | Gapontsev et al. | 385/126 |
| 7,623,747 B2 | 11/2009 | De Montmorillon et al. | 385/124 |
| 2003/0081921 A1 | 5/2003 | Sillard et al. | 385/124 |
| 2003/0210878 A1 | 11/2003 | Kumano et al. | 385/127 |
| 2004/0033039 A1 | 2/2004 | Oliveti et al. | 385/123 |
| 2004/0086245 A1 | 5/2004 | Farroni et al. | 385/123 |
| 2006/0140560 A1 | 6/2006 | Allen et al. | 385/123 |
| 2007/0003199 A1 | 1/2007 | Mattingly et al. | 385/124 |
| 2007/0127878 A1 | 6/2007 | Demontmorillon et al. | 385/124 |
| 2007/0258686 A1 | 11/2007 | De Montmorillon et al. | 385/127 |
| 2007/0280615 A1 | 12/2007 | De Montmorillon et al. | 385/127 |
| 2008/0013905 A1 | 1/2008 | Bookbinder et al. | 385/124 |
| 2008/0056654 A1 | 3/2008 | Bickham et al. | 385/124 |
| 2008/0056658 A1* | 3/2008 | Bickham et al. | 385/127 |

FOREIGN PATENT DOCUMENTS

| | | |
|---|---|---|
| WO | WO01/47822 | 7/2001 |
| WO | WO2008/027336 | 3/2008 |
| WO | WO2008/027351 | 3/2008 |

OTHER PUBLICATIONS

Allard, Philippe G et al, "Bending-loss studies of a single-mode triangular-index fiber with a depressed cladding ring with a vector-mode method", Applied Optics, vol. 33, No. 33, Nov. 20, 1994, pp. 7725-7732.

Jeunhomme, Luc B., *Single-Mode Fiber Optics, Principles and Applications*, Second Edition, Revised and Expanded, pp. 39-44.

Yip, G L et al, "Dispersion Studies of a Single-Mode Triangular-Core Fiber with a Trench By The Vector Mode Analysis", 1989 IEEE MTT-S Digest, pp. 1175-1178.

Yip, Gar Lam et al, "Dispersion studies of a single-mode triangular-index fiber with a trench by the vector mode analysis", Applied Optics, vol. 29, No. 36, Dec. 20, 1990, pp. 5343-5352.

Matsuo S et al., "Low-Bending-Loss and Low-Splice-Loss Single-Mode Fibers Employing a Trench Index profile", IEICE Transactions on Electronics, Electronics Society, Tokyo, JP, vol. E88-C, No. 5, May 2005, pp. 889-895.

* cited by examiner

LOW BEND LOSS SINGLE MODE OPTICAL FIBER

BACKGROUND OF THE INVENTION

1. Field of the Invention

The present invention relates generally to optical fiber, and particularly to bend resistant single moded optical fibers.

2. Technical Background

Optical fibers utilized in so-called "access" and fiber to the premises (FTTx) optical networks can be subjected to a variety of bending environments. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables.

SUMMARY OF THE INVENTION

Optical waveguide fiber is disclosed herein that is bend resistant and single moded at the wavelength of 1260 nm and at higher wavelengths. The optical fiber has a large effective area, which is beneficial, for example, for inhibiting signal nonlinearities especially at high bit rates. Preferably, the optical fiber has both low macrobend induced attenuation losses and low microbend induced attenuation losses.

The optical fiber disclosed herein comprises a glass core and a glass cladding surrounding and in contact with the core, the core being disposed about a centerline and extending from the centerline in a radial direction. The cladding comprises an annular inner region surrounding and in contact with the core region, an annular ring region surrounding and in contact with the annular inner region, and an annular outer region surrounding and in contact with the annular ring region and extending to an outermost glass radius. The annular ring region is located close to the core, and preferably the core and cladding provide increased bend resistance, both to macrobend and microbend conditions. Preferably, the ratio of the outermost radius of the core divided by the outermost radius of the annular inner region ($R_1/R_2$) is greater than 0.45 and less than 1, in some embodiments between 0.47 and 0.75 in some embodiments between 0.50 to 0.65, and in some embodiments between 0.55 to 0.65. The annular outer region is the outermost glass portion of the optical fiber. In preferred embodiments, the annular outer region is covered by one or more coatings, such as a urethane acrylate material.

The maximum relative refractive index of the glass core is less than 0.45%. The minimum relative refractive index of the annular ring region is less than or equal to −0.15%, more preferably less than −0.18%. The magnitude of the relative refractive index of the annular inner region is low, less than 0.05% and greater than −0.05%. The relative refractive index of the majority of the radial width of the annular inner region can be positive, negative, and/or zero. The radial width of the annular inner region is greater than 2 µm.

The relative refractive index of the core is measured at the peak index of the core and is preferably the greatest maximum relative refractive index of the entire optical fiber. The relative refractive index of the annular inner region is greater than or equal to the relative refractive index of the annular ring region. The absolute magnitude of the profile volume of the annular ring region is greater than 40%-µm², preferably between 40 and 60%-µm², even more preferably between 45 and 55%-µm². Preferably, the profile volume of the core is less than 6.2%-µm², more preferably between 5.0 and 6.2 µm². Preferably, the radial width of the core is less than or equal to 5.0 µm, more preferably between 3.0 and 5.0 µm.

In one set of embodiments, the annular ring region comprises silica glass having a dopant selected from the group consisting of germanium, aluminum, phosphorus, titanium, boron, and fluorine, although in preferred embodiments the annular ring region contains no germanium.

In another set of embodiments, the annular ring region comprises silica glass with a plurality of holes, the holes being either empty (vacuum) or gas filled, wherein the holes provide an effective refractive index which is low, e.g. compared to pure silica. Using the fiber profiles disclosed herein, fibers may be manufactured which exhibit a zero dispersion wavelength between 1300 and 1324 nm, and a dispersion at the zero dispersion wavelength which is less than 0.092 ps/nm²/km, and yet maintain a bend loss at 1550 nm less than 1 dB/turn, more preferably less than 0.5 dB/turn, and most preferably less than 0.3 dB/turn at a bend diameter of 20 mm (20 mm diameter mandrel), a bend loss at 1550 nm less than 1 dB/turn, more preferably less than 0.5 dB/turn, and most preferably less than 0.3 dB/turn at a bend diameter of 15 mm (15 mm diameter mandrel) and a bend loss less than 0.5 dB/turn, less than 2 dB/turn at a bend radius of 5 mm, more preferably less than 1 dB/turn at a bend diameter of 10 mm (10 mm diameter mandrel).

Reference will now be made in detail to the present preferred embodiments of the invention, examples of which are illustrated in the accompanying drawings.

DETAILED DESCRIPTION OF THE PREFERRED EMBODIMENT

Figure 1:
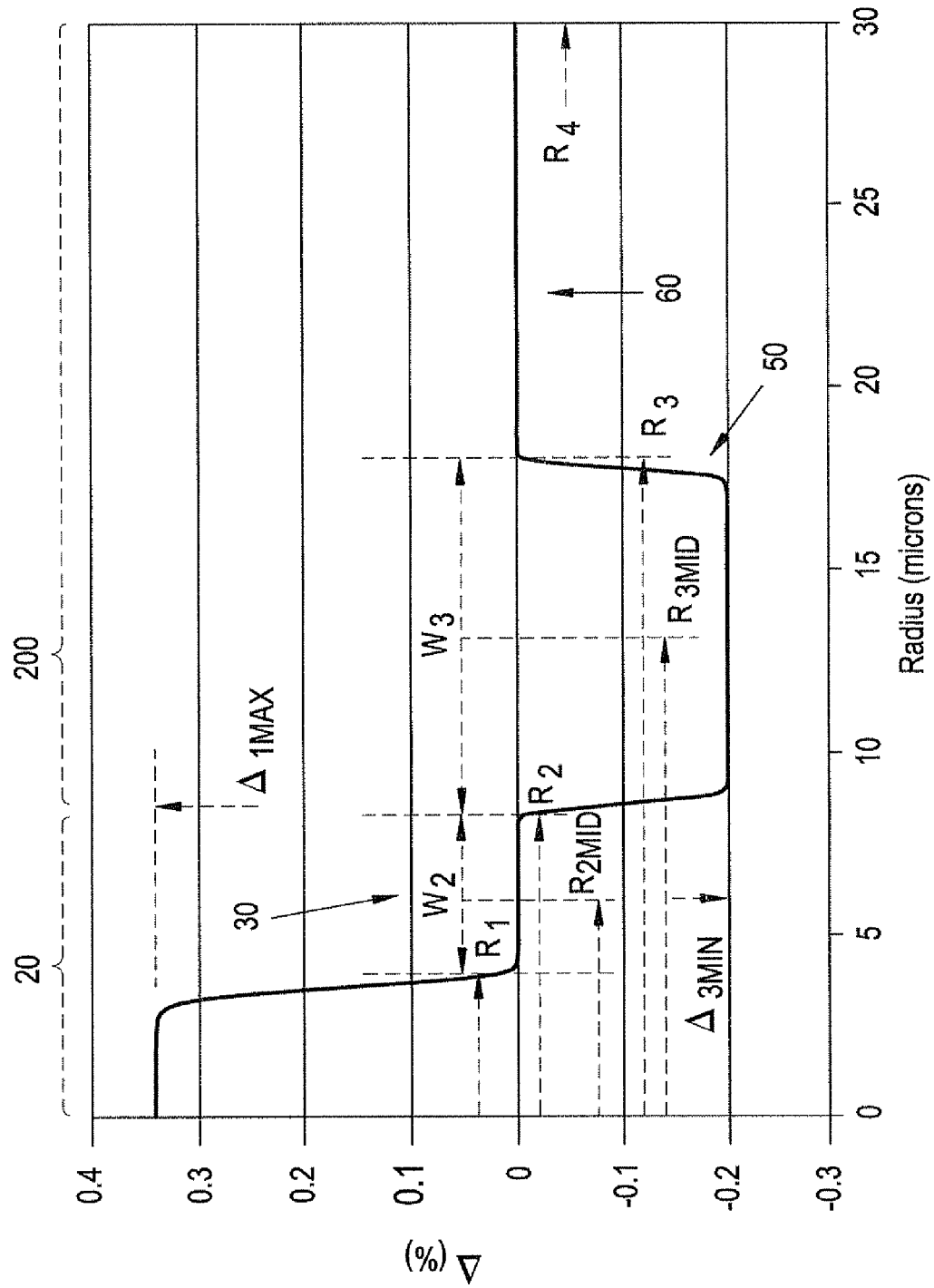
FIG. 1 schematically shows a relative refractive index profile of an embodiment of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the annular outer region of the cladding. As used herein, the relative refractive index is represented by $\Delta$ and its values are given in units of "%", unless otherwise specified.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff}=2\pi(\int f^2\, r\, dr)^2/(\int f^4\, r\, dr),$$

where the integration limits are 0 to ∨, and f is the transverse component of the electric field associated with light propagated in the waveguide. As used herein, "effective area" or "$A_{eff}$" refers to optical effective area at a wavelength of 1550 nm unless otherwise noted.

The term "a-profile" or "alpha profile" refers to a relative refractive index profile, expressed in terms of Δ(r) which is in units of "%", where r is radius, which follows the equation, $$\Delta(r)=\Delta(r_0)(1-[|r-r_0|/(r_1-r_0)]^\alpha),$$

where $r_0$ is the point at which Δ(r) is maximum, $r_1$ is the point at which Δ(r)% is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2\, r\, dr/\int [(df/dr)^2\, r\, dr)$, the integral limits being 0 to ∨.

The bend resistance of a waveguide fiber can be gauged by induced attenuation under prescribed test conditions, e.g. the amount of increased attenuation (bend loss) per turn around a mandrel of certain diameter (e.g. 5 mm, 10 mm, or 20 mm).

The cabled cutoff wavelength, or "cabled cutoff" is even lower than the measured fiber cutoff due to higher levels of bending and mechanical pressure in the cable environment. The 22 m cabled cutoff measurement utilized herein is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode. Unless otherwise noted herein, a wavelength of 1550 nm is the reference wavelength.

In some preferred embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

In some embodiments, the refractive index profile of the optical fiber disclosed herein is non-negative from the centerline to the inner radius of the annular segment, $R_2$. In some embodiments, the optical fiber contains no index-decreasing dopants, such as fluorine, in the core.

Referring to FIG. 1, optical waveguide fibers are disclosed herein which comprise: a core 20 extending radially outwardly from the centerline to a central segment outer radius, $R_1$, and having a relative refractive index profile, $\Delta_i(r)$ in %, with a maximum relative refractive index percent, $\Delta_1$; and, a cladding 200 surrounding and directly adjacent, i.e. in direct contact with, the core 20. Cladding 200 comprises: an annular inner region 30 surrounding the core 20 and directly adjacent thereto, extending radially outwardly to an annular inner region outer radius, $R_2$, having a width $W_2$ disposed at a midpoint $R_{2MID}$, the region 30 having a relative refractive index profile, $\Delta_2(r)$ in %; an annular ring region 50 surrounding region 30 and directly adjacent thereto, and extending radially outwardly from $R_2$ to an annular ring region radius, $R_3$, the region 50 having a width $W_3$ disposed at a midpoint $R_{3MID}$, and having a relative refractive index profile, $\Delta_3(r)$ in %, with a minimum relative refractive index percent, $\Delta_3$, in %, wherein $\Delta_1>0>\Delta_3$; and an annular outer region 60 surrounding the region 50 and directly adjacent thereto and having a relative refractive index percent, $\Delta_{CLAD}(r)$ in %. $R_1$ is defined to occur at the radius where $\Delta_1(r)$ first reaches +0.03. That is, core 20 ends and the annular ring region 30 starts where the relative refractive index first reaches +0.03% (going outward radially) at a radius R1, and region 30 is defined to end at a radius R2 where the relative refractive index $\Delta_2(r)$ first reaches −0.03% (going outward radially). The annular ring region 50 begins at $R_2$ and ends at $R_3$ for this group of embodiments. $R_3$ is defined to occur where the relative refractive index $\Delta_3(r)$ first reaches −0.03% (going outward radially) after $\Delta_3(r)$ has dipped to at least −0.1%. The width $W_3$ of the annular segment is $R_3$-$R_2$ and its midpoint $R_{3MID}$ is $(R_2+R_3)/2$. In some embodiments, $|\Delta_2(r)|<0.025\%$ for more than 50% of the radial width of the annular inner region 30, and in other embodiments $|\Delta_2(r)|<0.01\%$ for more than 50% of the radial width of the annular inner region 30. $\Delta_3(r)$ is negative for all radii from $R_2$ to $R_3$. Preferably, $\Delta_{CLAD}(r)=0\%$ for all radii greater than 30 μm. Cladding 200 extends to a radius, $R_4$, which is also the outermost periphery of the glass part of the optical fiber. Also, $\Delta_1>\Delta_2>\Delta_3$. When we say, for example, $\Delta<-0.1\%$, we mean Δ is more negative than −0.1%.

The core has a profile volume, $V_1$, defined herein as:

$$2\int_0^{R_1} \Delta_1(r)\,dr.$$

The annular ring region has a profile volume, $V_3$, defined herein as:

$$2\int_{R_2}^{R_3} \Delta_3(r)\,dr.$$

Preferably, $\Delta_{1MAX}<0.45\%$, $\Delta_2>-0.05\%$, $\Delta_2<0.05\%$, $\Delta_{3MIN}\leq-0.15\%$, $R_1\leq 5.0$ μm, $R_1/R_2>0.45$ and $<0.60$, more preferably $>0.47$ and $<0.60$, and even more preferably $>0.47$ and $<0.55$ and the absolute magnitude of the profile volume of the annular ring region, $|V_3|$, is greater than 40%-μm². In some embodiments, $0.47<R_1/R_2<0.55$. In some preferred embodiments, $\Delta_{3MIN}\leq-0.18\%$, and in some even more preferred embodiments, $\Delta_{3MIN}\leq-0.2\%$.

Preferably, $W_2>2$ μm.

In some embodiments, 40%-μm²<$|V_3|$<60%-μm². In other embodiments, 45%-μm²<$|V_3|$<55%-μm².

Preferably, $0.28\%<\Delta_1<0.45\%$, more preferably $0.30\%<\Delta_1<0.40\%$, and in some embodiments $0.31\%\leq\Delta_1\leq0.38\%$.

In some embodiments, $R_1<5.0$ μm, and in other embodiments 3.0 μm<$R_1$<5.0 μm, more preferably 3.5 μm<$R_1$<4.5 μm.

Preferably, $R_2>6.0$ μm and $<11$ μm, more preferably, $R_2>7.0$ μm and $<9$ μm.

Preferably, $R_3>10.0$ μm, more preferably $>12$. R3 is preferably $<21.0$ μm, more preferably $<18$ μm.

In some embodiments $W_3>1.0$ μm, and in other embodiments $1.0<W_3<8.0$ μm, and in other embodiments $2.0<W_3<8.0$ μm.

Preferably, $R_4>40$ μm. In some embodiments, $R_4>50$ μm. In other embodiments, $R_4>60$ μm. In some embodiments, 60 μm<$R_4$<70 μm.

Preferably, the optical fiber disclosed herein provides: a mode field diameter at 1310 nm of greater than 8.2 μm, more preferably greater than 8.8; a mode field diameter at 1550 nm of greater than 9.5 μm, more preferably greater than 9.8; a zero dispersion wavelength between 1300 and 1324 nm; and a cable cutoff wavelength less than 1260 nm.

Table 1 lists characteristics of illustrative examples, Examples 1-8, of a first set of embodiments. FIG. 1 schematically shows a refractive index profile corresponding to Examples 1-10.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Core delta (%) | 0.325 | 0.325 | 0.325 | 0.325 | 0.34 | 0.32 | 0.35 | 0.33 | 0.325 | 0.325 |
| Core radius (μm) | 3.9 | 3.9 | 3.9 | 3.9 | 3.8 | 4 | 3.8 | 4 | 4.4 | 4.5 |
| Core volume (%·μm$^2$) | 4.94 | 4.94 | 4.94 | 4.94 | 4.62 | 5.12 | 5.05 | 5.28 | 4.48 | 4.45 |
| Ring delta (%) | −0.2 | −0.25 | −0.30 | −0.35 | −0.2 | −0.2 | −0.3 | −0.3 | −0.2 | −0.16 |
| Ring start (μm) | 7.90 | 8.25 | 8.50 | 8.70 | 8.45 | 7.15 | 7.6 | 8.7 | 7.35 | 6.63 |
| Ring width (μm) | 9.78 | 8.13 | 6.96 | 6.09 | 9.2 | 9.5 | 8.0 | 6 | 10.8 | 13.2 |
| Ring volume (%·μm$^2$) | −50 | −50 | −50 | −50 | −48 | −45 | −56 | −42 | −49 | −50 |
| Core clad ratio | 0.49 | 0.47 | 0.46 | 0.45 | 0.45 | 0.53 | 0.5 | 0.46 | 0.60 | 0.68 |
| LP11 Cutoff (nm) | 1068 | 1070 | 1071 | 1072 | 1075 | 1073 | 1075 | 1106 | 1058 | 1036 |
| MFD at 1310 nm (μm) | 8.8 | 8.8 | 8.8 | 8.8 | 8.7 | 8.8 | 8.4 | 8.8 | 8.8 | 8.9 |
| Lambda zero (nm) | 1312 | 1312 | 1312 | 1312 | 1322 | 1302 | 1308 | 1310 | 1312 | 1312 |
| 1310 nm Slope (ps/nm$^2$/km) | 0.0900 | 0.0904 | 0.0908 | 0.0911 | 0.0874 | 0.0919 | 0.0916 | 0.0907 | 0.0906 | 0.0904 |
| MFD at 1550 nm (μm) | 9.9 | 9.9 | 9.9 | 9.9 | 9.9 | 9.8 | 9.4 | 9.9 | 9.9 | 10.0 |

Table 1 sets forth LP11 (theoretical) cutoff wavelength. While the cable and fiber cutoff wavelengths for these fibers will be higher than the theoretical cutoff wavelength listed, it is believed that each of the fibers in Table 1 will exhibit a cable cutoff less than 1260 nm (and thus also a fiber cutoff less than 1260 nm). In addition, each of the fibers listed in Table 2 will exhibit an attenuation less than 0.20 at 1550 nm, mode field diameter at 1310 greater than 8.2 μm, more preferably greater than 8.4 mode field diameter at 1550 greater than 9 μm, more preferably greater than 9.8 μm, a zero dispersion wavelength between 1300 and 1324 nm, and a dispersion at the zero dispersion wavelength which is less than 0.092 ps/nm$^2$/km, and yet maintain a bend loss at 1550 nm less than 1 dB/turn with a bend radius of 10 mm, less than 2 dB/turn, more preferably less than 1 dB/turn at a bend radius of 5 mm, illustrating that these fibers are very suitable for fiber to the home applications. The optical fibers disclosed herein exhibit superior bend resistance, both macrobend and microbend. The pin array bend loss at 1550 nm (attenuation increase associated with the optical fiber tested in a pin array), one measure of macrobend loss, is less than 15 dB, preferably less than 10 dB, and in some embodiments less than 5 dB. Also, the lateral load wire mesh loss at 1550 nm, one measure of microbend loss, is less than 0.5 dB, preferably less than 0.3 dB, and in some embodiments less than 0.2 dB.

We have also found that the LP11 theoretical cutoff wavelength generally can serve as an upper bound on the 2 m fiber cutoff wavelength for the optical fiber disclosed herein. As illustrated by Examples 1-10, the LP11 theoretical cutoff wavelength is less than 1280 nm, preferably less than 1270 nm, and even more preferably less than 1260 nm. We have also found that for a given core profile, increasing the magnitude of the profile volume, $|V_3|$, without limit causes the cutoff wavelength to increase to the point that the optical fiber is multimoded at 1310 nm or even at 1550 nm. Accordingly, in some preferred embodiments, 40%-μm$^2$ < $|V_3|$ < 60%-μm$^2$, more preferably 45%-μm$^2$ < $|V_3|$ < 55%-μm$^2$.

We have also found that a higher core volume generally not only tends to increase the size of the mode field, but also raises the LP11 theoretical cutoff wavelength, and therefore tends to raise the 2 m fiber cutoff wavelength. Accordingly, in some embodiments, the profile volume of the core, V1, is greater than 0 and less than 6.5%-μm$^2$, in other embodiments less than 6.2%-μm$^2$, and in some embodiments, such as Examples 1-7, V1 is between 5.50 and 6.00%-μm$^2$.

The core 20 shown in FIG. 1 has a refractive index profile with an alpha shape, wherein $\alpha_1$ is about 10. However, the core 20 could have other values of $\alpha_1$, or the core could have a profile shape other than an alpha profile, such as a multi-segmented core. Preferably the core exhibits an alpha greater than 5, more preferably greater than 8, and most preferably 10 or more.

Table 2 lists the characteristics of 2 preferred fibers in accordance with the invention that were manufactured and whose properties as set forth in Table 2 were measured.

TABLE 2

| | Ex. 11 | Ex. 12 |
|---|---|---|
| Core delta (%) | 0.33 | 0.33 |
| Core radius (μm) | 5.0 | 4.8 |
| Core volume (%·μm$^2$) | 5.6 | 5.2 |
| Ring delta (%) | −0.2 | −0.2 |
| Ring start (μm) | 8.3 | 7.9 |
| Ring width (μm) | 10.9 | 10.5 |
| Ring volume (%·μm$^2$) | −52 | −47 |
| Core clad ratio | 0.61 | 0.61 |
| 22 m CableCutoff (nm) | 1233 | 1217 |
| MFD at 1310 nm (μm) | 9.2 | 8.9 |
| Lambda zero (nm) | 1304 | 1306 |
| 1310 nm Slope (ps/nm$^2$/km) | 0.091 | 0.091 |
| MFD at 1550 nm (μm) | 10.3 | 10.2 |

TABLE 2-continued

|  | Ex. 11 | Ex. 12 |
|---|---|---|
| attenuation at 1550 nm, dB/Km | 0.190 | 0.192 |
| bend loss dB/turn, 10 mm diameter mandrel | 0.34 | 0.46 |
| bend loss dB/turn, 15 mm diameter mandrel | 0.10 | 0.16 |
| bend loss dB/turn, 20 mm diameter mandrel | 0.06 | 0.06 |

Figure 2:
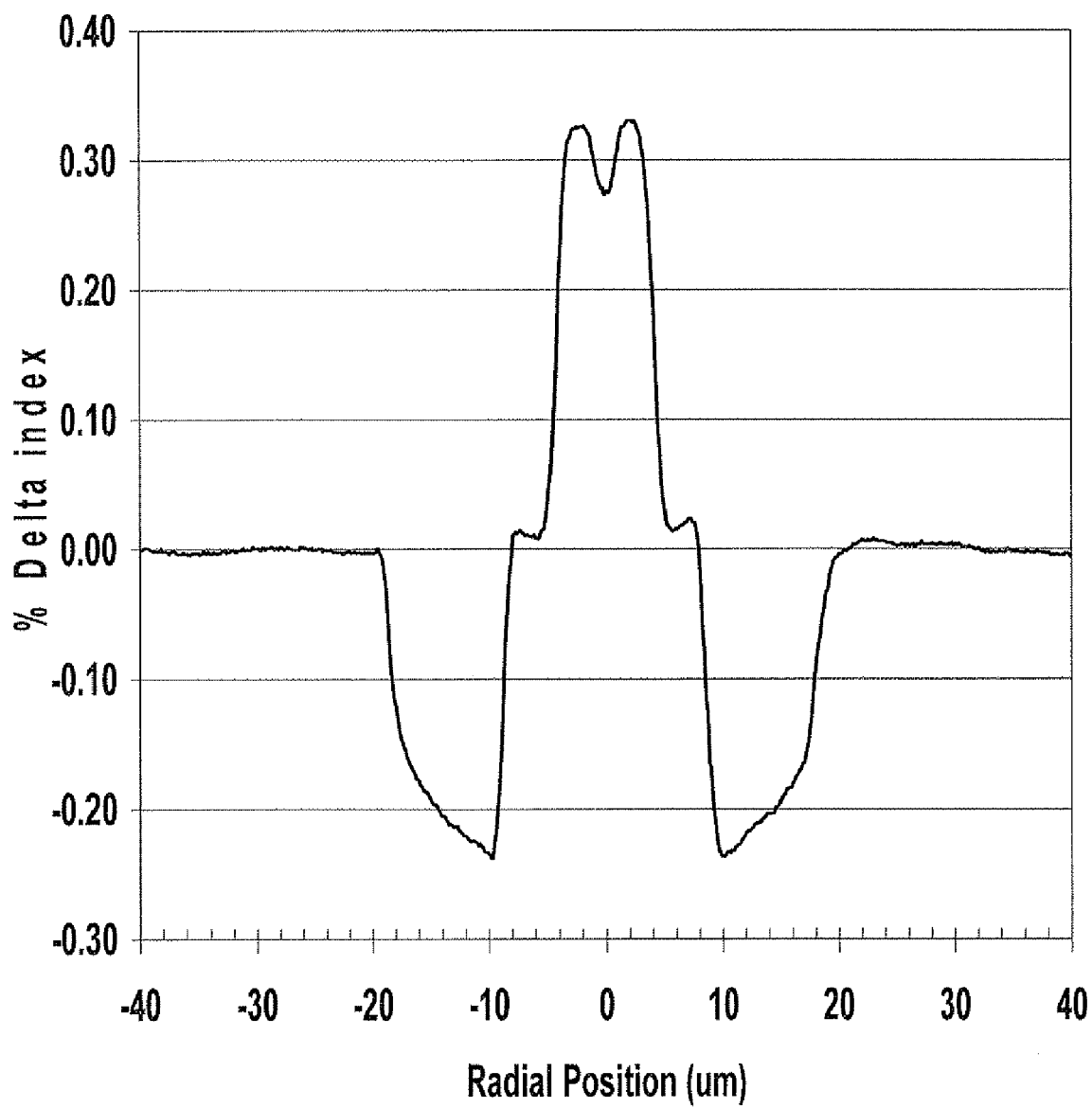
FIG. 2 shows a refractive index profile of an actual fiber (Example 11 described below), measured using refracted near field measurement.

The core refractive index profile of Example 11, measured using refracted near field measurement technique, is shown in FIG. 2. Each of the fibers in Table 2 exhibit a cable cutoff less than 1260 nm (and thus also a fiber cutoff less than 1260 nm), attenuation less than 0.20 at 1550 nm, mode field diameter at 1310 greater than 8.8 µm, mode field diameter at 1550 greater than 9.8 µm, zero dispersion wavelength between 1300 and 1324 nm, and a dispersion at the zero dispersion wavelength which is less than 0.092 ps/nm²/km, and yet maintain a bend loss at 1550 nm less than 0.1 dB/turn (actually less than 0.08 dB/turn) at a bend diameter of 20 mm, a bend loss at 1550 nm less than 0.3 dB/turn (actually less than 0.15 dB/turn) at a bend diameter of 15 mm and a bend loss less than 1 dB/turn (actually less than 0.5 dB/turn) at a bend diameter of 10 mm (10 mm diameter mandrel), illustrating that these fibers are very suitable for fiber to the home applications. The optical fibers disclosed herein exhibit superior bend resistance, both macrobend and microbend. The pin array bend loss at 1550 nm (attenuation increase associated with the optical fiber tested in a pin array), one measure of macrobend loss, is less than 15 dB, preferably less than 10 dB, and in some embodiments less than 5 dB. Also, the lateral load wire mesh loss at 1550 nm, one measure of microbend loss, is less than 0.5 dB, preferably less than 0.3 dB, and in some embodiments less than 0.2 dB.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
 a glass core extending from a centerline to a radius $R_1$;
 a glass cladding surrounding and in contact with the core, the cladding comprising:
  an annular inner region extending from $R_1$ to a radius $R_2$, the inner region comprising a radial width, $W_2 = R_2 - R_1$,
  an annular ring region extending from $R_2$ to a radius $R_3$, the ring region comprising a radial width, $W_3 = R_3 - R_2$, and
  an annular outer region extending from $R_3$ to an outermost glass radius $R_4$;
 wherein the core comprises a relative refractive index, $\Delta_1$, relative to the outer region less than 0.45% and an alpha greater than 5;
 wherein the annular inner region comprises a radial width, $W_2$, a minimum relative refractive index, $\Delta_{2MIN}$, relative to the outer region, and a maximum relative refractive index, $\Delta_{2MAX}$, relative to the outer region, wherein $\Delta_2$ is zero or negative;
 wherein the annular ring region comprises:
  a minimum relative refractive index, $\Delta_{3MIN}$, relative to the annular outer region, wherein $\Delta_{3MIN} \leq -0.15\%$ and $\geq -0.4$;
 wherein $\Delta_{1MAX} > \Delta_{2MAX} > \Delta_{3MIN}$, and $\Delta_{1MAX} > \Delta_{2MIN} > \Delta_{3MIN}$;
 wherein $0.45 < R_1/R_2 < 1$; and
 wherein the annular ring region comprises a profile volume, $V_3$, equal to:

$$2\int_{R_2}^{R_3} \Delta(r)\,dr;$$

wherein $V_3$ is greater than 40%-µm², the core and the cladding provide a cable cutoff less than 1260 nm, a zero dispersion between 1300 and 1324 nm, a mode field diameter at 1310 nm of between 8.20 and 9.50 µm, and a 10 mm diameter mandrel bend loss of less than 1.0 dB/turn.

2. The optical fiber of claim 1, wherein $0.47 < R_1/R_2 < 0.75$.

3. The optical fiber of claim 2, wherein the annular ring region comprises a profile volume, $V_3$, wherein 45%-µm² < $|V_3|$ < 55%-µm².

4. The optical fiber of claim 2, wherein the core comprises an alpha greater than 10.

5. The optical fiber of claim 4 wherein $0.28\% < \Delta_{1MAX} < 0.45\%$.

6. The optical fiber of claim 4 wherein $R_1 < 5.0$ µm.

7. The optical fiber of claim 4 wherein $R_2 > 6$ µm.

8. The optical fiber of claim 4 wherein $R_3 > 10$ µm.

9. The optical fiber of claim 4 wherein $W_3$ is between 2 and 8 µm.

10. The optical fiber of claim 4 wherein the core comprises a profile volume, $V_1$, equal to:

$$2\int_0^{R_1} \Delta(r)\,dr;$$

wherein $V_1 < 6.2\%$-µm.

11. The optical fiber of claim 4 wherein the core and the cladding provide a fiber cutoff wavelength less than 1260 nm.

12. The optical fiber of claim 4 wherein the core and the cladding provide a zero dispersion between 1300 and 1324 nm.

13. The optical fiber of claim 4 wherein the core and the cladding provide a mode field diameter at 1310 nm of between 8.20 and 9.50 µm.

14. The optical fiber of claim 4 wherein the core and the cladding provide a 10 mm diameter mandrel bend loss of less than 1.0 dB/turn.

15. The optical fiber of claim 4 wherein the core and the cladding provide a 20 mm diameter mandrel bend loss of less than 0.05 dB/turn.

16. The optical fiber of claim 1, wherein the annular ring region comprises a profile volume, $V_3$, where $45\%\text{-}\mu m^2 < |V_3| < 55\%\text{-}\mu m^2$.

17. The optical fiber of claim 16, wherein the core comprises an alpha greater than 10.

18. The optical fiber of claim 1, wherein the core comprises an alpha greater than 10.

19. The optical fiber of claim 1 wherein the core and the cladding provide a 20 mm diameter mandrel bend loss of less than 0.05 dB/turn.

20. The optical fiber of claim 1, wherein $R_2 > 7.0\ \mu m$ and $< 9\ \mu m$.

21. The optical fiber of claim 1, wherein $0.31\% \leq \Delta_1 \leq 0.38\%$.

22. The optical fiber of claim 1, wherein $V_3$ is between 40 and $60\%\text{-}\mu m^2$.

* * * * *